United States Patent Office 3,433,471
Patented Mar. 18, 1969

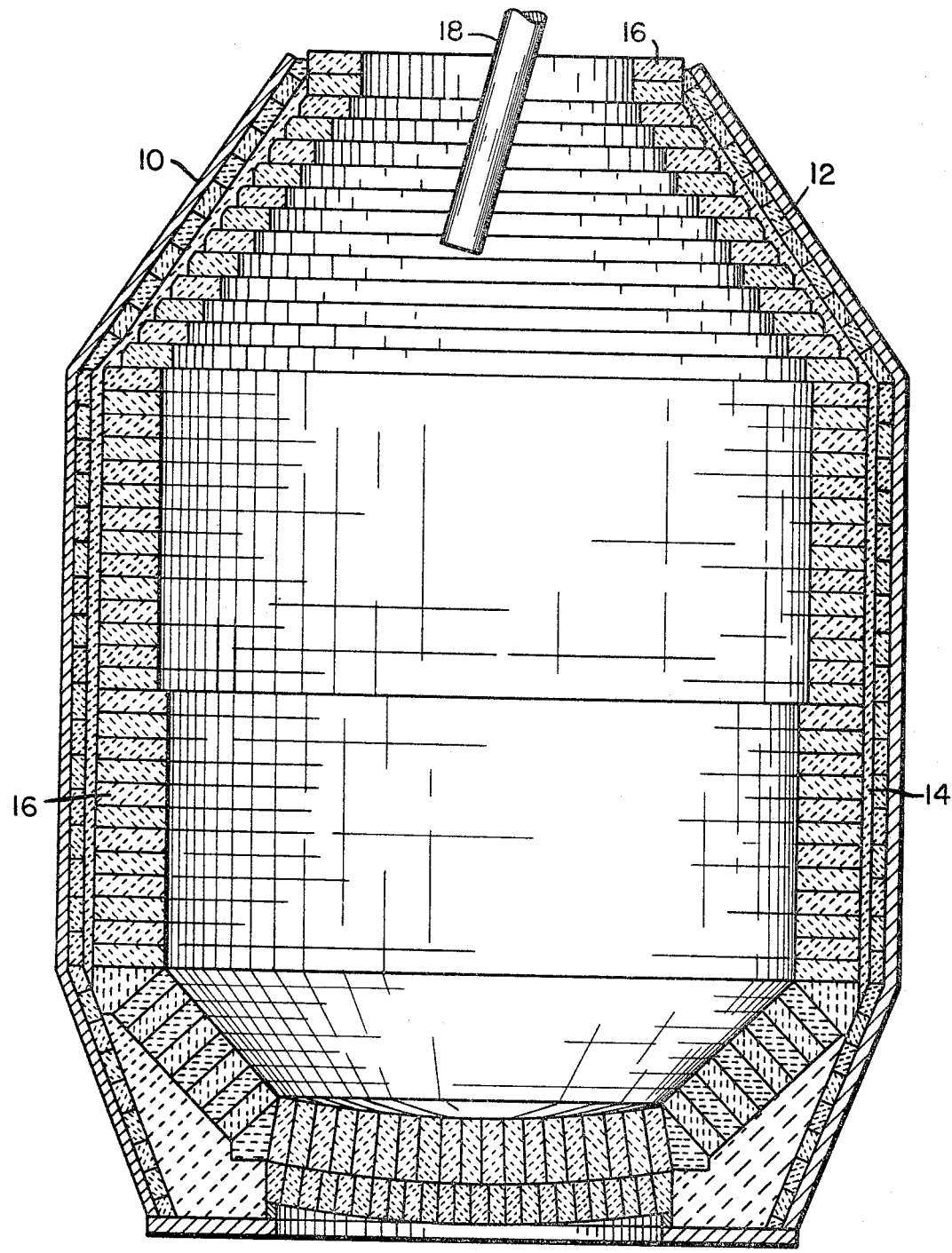

3,433,471
METALLURGICAL FURNACE
Allen M. Alper, Corning, N.Y., assignor to Corning Glass Works, Corning, N.Y., a corporation of New York
Filed Dec. 8, 1965, Ser. No. 512,313
U.S. Cl. 266—35                                    10 Claims
Int. Cl. C21c 5/44, 7/06; C22c 29/00

ABSTRACT OF THE DISCLOSURE

Basic oxygen steelmaking vessels (e.g., L. D. or Linz-donawitz and Kaldo or Stora-Kaldo vessels) having a refractory lining therein comprised, either wholly or in part, of crystalline refractory that consists essentially of material, which forms the major constituent of the crystalline refractory, selected from the group consisting of carbides, borides and nitrides of titanium and zirconium, boron carbide, and solid solutions and mixtures thereof, a silicon carbide content limited to 0–25 wt. percent, and the balance, if any other than incidental impurities, being free or uncombined carbon (graphite) and/or one or more of carbides, borides and nitrides of Hf, V, Nb, Ta, Cr, Mo, W, Mn and Fe and/or 0–5 wt. percent of oxides of the aforesaid metals and boron.

---

Heretofore, linings in basic oxygen steelmaking vessels have been constructed of basic refractory bricks and materials because it was believed that they would give the best refractory service life in such basic slag environments. This practice and belief has continued despite the suggestion (see United States Patent No. 628,288) of using silicon carbide for the linings in early basic metallurgical or steelmaking furnaces such as the basic Bessemer (Thomas) converter. Of course there is good reason for this situation. Despite the recommended use in the early steelmaking furnaces, silicon carbide cannot be used practically in basic oxygen steelmaking vessels because the much higher temperatures and more corrosive basic ferruginous slags and atmospheres in the latter vessels corrodes and erodes silicon carbide bricks more rapidly than the better basic refractories now being employed in those vessels.

It appears that refractory materials such as those mentioned in the first paragraph above were never previously thought to be suitable for linings in steelmaking furnaces because of their very poor oxidation resistance and the very poor resistance of their oxides to corrosion and erosion by basic ferruginous metallurgical slags. For example, $TiO_2$, $ZrO_2$ and $B_2O_3$ are each rapidly dissolved in such slags. However, it has now been surprisingly discovered that much more superior linings for basic oxygen steelmaking vessels can be obtained by constructing the linings of carbides, borides and/or nitrides of titanium and/or zirconium and/or boron carbide. Upon further study of this discovery, it is now believed to be the result of an environmental condition inside basic oxygen steelmaking vessels that involves a low partial pressure of oxygen, which is in contrast to high partial pressures of oxygen in the environments within the previously more common steelmaking furnaces, such as open hearth furnaces and some electric furnaces. It is thought that, because of the low partial pressures of oxygen, the soluble oxides of titanium, zirconium and/or boron do not form, and the carbides, borides and/or nitrides of these elements have been found to be very insoluble in the basic ferruginous slags and slag vapors. In fact, these latter materials are found to be hardly even wet by such slags.

Hence, a principal object of this invention is to permit more efficient operation of basic oxygen steelmaking vessels by substantially increasing the life of the refractory liners therein. Since the materials set forth in the first paragraph above are very refractory, they should permit the operation of these vessels at higher temperatures, which in turn should decrease the time needed to make a heat of steel. Since these materials also have good abrasion resistance, they may permit the use of more abrasive steelmaking charge ingredients, which might be preferred for their lower cost. Further, most of these materials have greater thermal shock resistance than the more conventionally employed oxidic refractories. This latter factor should permit greater temperature fluctuation in the basic oxygen steelmaking processes without causing detrimental cracking or spalling of the liners.

It is also an object of this invention to provide a basic oxygen steelmaking vessel with a refractory lining superior in corrosion-erosion resistance to molten ferrous metal and basic ferruginous slag under the usual prevailing reducing atmosphere conditions as compared to many of the various basic refractory working linings commercially employed heretofore.

Other objects and advantages of the present invention will be apparent to those skilled in this art from the following detailed description in conjunction with the accompanying drawing wherein the sole figure is a view in longitudinal cross section of a representative basic oxygen steelmaking vessel having a working lining made up of refractory brick according to this invention.

Referring now to the drawing, a basic oxygen steelmaking vessel is generally barrel-shaped and usually comprises a metal (e.g., steel) shell or tank 10, a permanent or shell insulating lining of bricks 12, a rammed refractory interlayer 14, a working lining of bricks 16 and a lance 18 of conventional construction for providing an oxygen blast directed into the refractory lined shell. The bricks of lining 12 can be made of materials commonly used for that purpose heretofore, e.g., burnt magnesite, or of any other suitable material such as carbon blocks made from comminuted particles of carbon and a carbonizable binder, as is shown. The rammed intermediate layer 14 can be made of basic refractory plastic or ramming mixes previously employed for that purpose (e.g., tardolomite or magnesite mixes). Other suitable ramming mixes can also be employed for layer 14, among which are mixtures of comminuted carbon or the material employed in the working lining bricks 16 of this invention mixed with about 4–20 wt. percent (preferably 5–10 wt. percent) of cokable carbonaceous bonding materials. Well known and preferred among the latter class of bonding materials are tars and pitches.

The working lining 16 could be formed as a monolith from a suitable ramming mix of the material according to this invention, but by present practice it is most preferred to build lining 16 with bricks. These bricks can be made by any of the processes that are now used for making refractory products. For example, they can be made by fusion casting completely molten material to form solidified monolithic individual bricks or billets from which the bricks can be sawed, or by pressure molding a batch of solid granular or grain material with any of the usual bonding means. The latter bonding means include ceramically by burning the molded brick to sinter the particles together as a strongly coherent mass, chemically by mixing into the molding batch a suitable chemical bonding agent (e.g., chromate, aluminate, phosphate, etc.), and organically by employing a cokable carbonaceous bonding material such as tar or pitch in the molding batch. The grain material for bonded bricks can be either fused or solid state reacted materials that are crushed to finely divided grain of sizes generally employed for brickmaking as is known. The grain material can also be screened into two or more different size fractions, including forming a grog fraction, as desired to obtain the usual benefits of such procedures, e.g., denser packing, stronger bodies, less firing shrinkage and cracking, etc. Also if desired, the known techniques of tar-impregnation can be applied to ceramically bonded bricks and to some degree to fused cast bricks cut from billets.

The manufacture of the carbides, borides and nitrides forming the essential novel feature of this invention has been described in publications heretofore and, therefore, no detailed description of it will be reiterated here. But it should be noted that the raw materials selected (e.g., carbon, boron, borate, metals, metal oxides or carbonates or carbides or borides or nitrides, etc.), should have a purity, be proportioned and be reacted, either in the solid or molten state, so that the resulting product material has the proper composition as defined above. Of course, the burden of proper manufacture can be avoided by purchasing the commercially available materials of proper composition and utilizing such materials for making the bricks.

In any event, care should be taken to avoid as much as possible the oxides of the metals and silicon carbide in the material of which the bricks are made because these constituents greatly lower the corrosion-erosion resistance to an intolerable degree. Laboratory tests have shown that silicon carbide contents of only 40 wt. percent lower the corrosion-erosion resistance to basic ferruginous slags by factors of 2 to 3 times the resistance of similar material without any silicon carbide content. Also noteworthy is the fact that refractories of material according to this invention exhibit as much as ten times the resistance to corrosion-erosion by such slags than does silicon carbide.

Even more important is the fact that refractories of material according to this invention are substantially superior in basic slags corrosion-erosion resistance to a number of the present commercial refractories, such as burned magnesites with and without tar impregnation, burned and fused cast magnesia-chrome ore compositions, and tar-bonded dolomites. Moreover, especially good advantage is attained with fused cast bricks forming the lining according to this invention because upon solidification the forming crystals intergrow and interlock with each other to provide very tight intercrystalline bonding and optimum density, which results in optimum resistance to corrosion-erosion by the molten slags and metals in the basic oxygen vessels.

The unique advantages of the present invention will be especially apparent from the data set forth in the table below. Since steel producers are understandably reluctant to put a new refractory in a commercial production vessel until some preliminary evaluation indiciates reasonable expectation that such refractory will not prematurely fail therein, a slag corrosion-erosion test was devised that by experience has demonstrated a fair ability to indicate the character of performance to be expected in a commercial production vessel. The test comprises placing 1½″ x 1″ x ½″ samples of the refractory in a furnace having a CO atmosphere adapted to approximate a basic oxygen vessel environment. At 1700° C. for about 2½ to 3 hours, the samples are passed, with one of their largest surfaces facing upward, through a downwardly directed stream of molten basic slag droplets at a substantially uniform rate of 60 times per hour until 2 kilograms of slag have been employed. The slag is representative of basic oxygen process slag developed during the production of a heat of steel and had the following composition, by weight: 23.75% $Fe_2O_3$, 25.94% $SiO_2$, 40.86% CaO, 6.25% MgO and 3.20% $Al_2O_3$. At the end of the test, the thickness of the samples in the area corroded-eroded by the slag is measured and compared with the original ½″ thickness prior to testing. The results are expressed as a percentage change in thickness and called "percent slag cut." The values given in the table for "percent slag cut" are comparative averages based on the results of many corrosion-erosion tests. The fused examples were completely melted batches of the metal or boron plus carbon, the metal plus boron and the metal after having been nitrided in a gaseous nitrogen atmosphere, respectively. The molten reacted batches were solidified in situ, i.e., in the furnace container where they were melted, to form the monolithic samples. The grain employed in the sintered and tar-bonded TiC samples was formed by crushing arc-melted and solidified masses of TiC. In all the samples of carbide, boride and nitride of titanium and zirconium, the indicated compound comprised in excess of 95 wt. percent of the total composition with the remainder, if any, being free carbon plus incidental impurities derived from the raw materials.

*Table*

| Refractory: | Percent slag cut |
|---|---|
| Fused TiC | 5–10 |
| Sintered (1900° C.) TiC grain | About 30 |
| Tar-bonded (6–10 wt. percent tar) TiC grain | 50–65 |
| Fused ZrC | 10–20 |
| Fused $TiB_2$ | About 20 |
| Fused $ZrB_2$ | About 15 |
| Fused TiN | About 20 |
| Fused ZrN | About 25 |
| Fused $B_4C$ | About 30 |
| Sintered SiC grain | 70–100 |
| Sintered (1650° C.) MgO | 40–70 |
| Sintered and tar-impregnated MgO | 70–100 |
| Fused cast 55 wt. percent magnesia–45 wt. percent Transvaal chrome ore | 40–100 |

Hence, except for the tar-bonded TiC, all the other examples according to this invention exhibit substantial improvement over the known commercially available sintered SiC brick and various basic refractories. But, even in the case of the tar-bonded TiC body, the results indicate improvement over such refractories as the tar-impregated magnesite and fused cast magnesite-chrome that have been commercially employed many times heretofore as linings in basic oxygen steelmaking vessels.

I claim:
1. A basic oxygen steelmaking vessel having a working refractory lining therein adapted to contact steelmaking ingredients and comprised of crystalline refractory that consists essentially of:
  (a) material selected from the group consisting of carbides, borides and nitrides of titanium and zirconium, boron carbide, and solid solutions and mixtures thereof, said material forming the major constituent of said refractory,
  (b) a silicon carbide content limited to 0–25 wt. percent, and
  (c) the balance, if any other than incidental impurities, being other material selected from the group consisting of free carbon, carbides, borides and nitrides of Hf, V, Nb, Ta, Cr, Mo, W, Mn and Fe, 0–5 wt. percent of oxides of the aforesaid metals and boron, and mixtures thereof.

2. The basic oxygen steelmaking vessel of claim 1 wherein said material comprises at least 75 wt. percent of the total refractory composition.

3. The basic oxygen steelmaking vessel of claim 2 wherein said material is titanium carbide and said other material, if any, is at least one of the group selected from free carbon and carbides of chromium and iron.

4. The basic oxygen steelmaking vessel of claim 2 wherein said material is zirconium carbide and said other material, if any, is free carbon.

5. The basic oxygen steelmaking vessel of claim 1 further characterized in that said vessel is tiltable and nonrotatable.

6. The basic oxygen steelmaking vessel of claim 1 further characterized in that said vessel is tiltable and rotatable.

7. The basic oxygen steelmaking vessel of claim 1 wherein said refractory is fused cast bricks.

8. The basic oxygen steelmaking vessel of claim 1 wherein said refractory is bonded grain bricks.

9. The basic oxygen steelmaking vessel of claim 8 wherein said bonded grain bricks are ceramically bonded.

10. The basic oxygen steelmaking vessel of claim 1 wherein said refractory is tar-impregnated bricks.

References Cited

UNITED STATES PATENTS

| | | | |
|---|---|---|---|
| 2,817,509 | 12/1957 | Solomon | 266—43 |
| 3,189,477 | 6/1965 | Shaffer | 106—43 |
| 3,190,626 | 6/1965 | Schwabe et al. | 266—43 X |
| 3,251,698 | 5/1966 | Colton | 106—57 X |
| 3,325,300 | 6/1967 | Wise et al. | 106—57 |

J. SPENCER OVERHOLSER, *Primary Examiner.*

EUGENE MAR, *Assistant Examiner.*

U.S. Cl. X.R.

106—43, 57; 266—43